United States Patent
Hsiao et al.

(10) Patent No.: US 9,568,376 B2
(45) Date of Patent: Feb. 14, 2017

(54) TEMPERATURE DETECTING CIRCUIT AND METHOD THEREOF

(71) Applicant: RICHTEK TECHNOLOGY CORP, Hsinchu (TW)

(72) Inventors: Sheng-Fu Hsiao, Hsinchu (TW); Hung-Shou Nien, Hsinchu (TW); Kuang-Feng Li, Hsinchu (TW); Yu-Wei Chang, Hsinchu (TW)

(73) Assignee: RICHTEK TECHNOLOGY CORP, Hsinchu (TW)

( * ) Notice: Subject to any disclaimer, the term of this patent is extended or adjusted under 35 U.S.C. 154(b) by 476 days.

(21) Appl. No.: 14/194,673

(22) Filed: Mar. 1, 2014

(65) Prior Publication Data
US 2014/0269840 A1    Sep. 18, 2014

(30) Foreign Application Priority Data
Mar. 15, 2013 (TW) .............................. 102109345 A

(51) Int. Cl.
*G01K 7/16* (2006.01)
*H02J 7/00* (2006.01)

(52) U.S. Cl.
CPC ............. *G01K 7/16* (2013.01); *G01K 2217/00* (2013.01)

(58) Field of Classification Search
CPC ............ G01K 7/16; G01K 7/24; G01K 13/00; G01K 15/007; G01K 2217/00; H02J 7/00
See application file for complete search history.

(56) References Cited

U.S. PATENT DOCUMENTS

| 5,788,789 A * | 8/1998 | Cooper | B23K 13/025 156/304.2 |
| 6,998,827 B2 * | 2/2006 | Gattavari | H02M 3/156 323/272 |
| 8,229,616 B2 * | 7/2012 | Aridome | B60K 6/445 180/65.265 |
| 8,648,565 B2 * | 2/2014 | Mitsutani | B60K 6/445 320/103 |
| 2010/0194353 A1 * | 8/2010 | Chen | H02M 3/33507 320/162 |
| 2012/0051095 A1 * | 3/2012 | Steigerwald | H02M 3/158 363/21.01 |

(Continued)

FOREIGN PATENT DOCUMENTS

CN    1624442 A    6/2005

*Primary Examiner* — Gail Kaplan Verbitsky
(74) *Attorney, Agent, or Firm* — Chun-Ming Shih

(57) ABSTRACT

A temperature detecting circuit and method thereof, adapted to a voltage converter circuit which includes a current detecting circuit having a detecting output port outputting a current detecting signal proportional to an output current of the voltage converter circuit, includes: a current signal processing unit, having a signal input port coupling to the detecting output port, a first detecting output port generating a first processing signal with a first temperature coefficient, a second detecting output port generating a second processing signal with a second temperature coefficient, wherein the first and the second processing signals are proportional to the current detecting signal; and, a temperature calculating unit, receiving the first and the second processing signals and performing calculation to derive a temperature value.

15 Claims, 15 Drawing Sheets

(56) References Cited

U.S. PATENT DOCUMENTS

| | | | | |
|---|---|---|---|---|
| 2013/0322488 A1* | 12/2013 | Yazami | ............... | G01N 27/27 374/142 |
| 2015/0256011 A1* | 9/2015 | Shi | ............... | G01R 31/3606 429/61 |
| 2016/0018474 A1* | 1/2016 | Kikuchi | ............ | H01M 10/486 324/431 |
| 2016/0248075 A1* | 8/2016 | Cruise | ............... | H01M 10/425 |

* cited by examiner

TEMPERATURE DETECTING CIRCUIT AND METHOD THEREOF

CROSS-REFERENCES TO RELATED APPLICATIONS

This non-provisional application claims priority under 35 U.S.C. §119(a) on Patent Application No. 102109345 filed in Taiwan, R.O.C. on Mar. 15, 2013, the entire contents of which are hereby incorporated herein by reference.

BACKGROUND

1. Technical Field

This present invention relates to a temperature detecting circuit and method, more specifically, to a temperature detecting circuit and method with less hardware requirement and capable of detecting current and temperature at the same time.

2. Description of Related Art

Please refer to U.S. Pat. No. 6,870,352. A current sensor (30) is shunt to an inductor (18) to detect the inductor current. The current sensor is also adopted as a compensation circuit to compensate the temperature coefficient of the inductor (18). Hence, the temperature coefficient of the signal representing the inductor current generated by the current sensor (30) is zero. Therefore, when accurate output current detection is required for reference on control in a voltage converter circuit, the current sensor (30) can be applied to alleviate the influence of temperature. For example, the current sensor (30) can be applied in a voltage converter circuit with the feature of adaptive voltage positioning (AVP), which renders the output voltage on the output node of the voltage converter circuit decreasing with the increase of the output current in order to allow larger tolerance range in a transient response of the output voltage. As a result, the decoupling capacitors on the output node can be reduced, which saves hardware cost and size, and power consumption can also be saved a bit under the criteria of complying with the specification of output voltage range.

Please refer to U.S. Pat. No. 6,998,827. A detecting device (2) is adopted to detect the output current of a voltage converter circuit and generate a detected current Ifb which is proportional to the output current and flows through a resistor Rfb coupled between an inverting terminal of an amplifier (3) and an output terminal of the voltage converter circuit. When the output current increases, the voltage drop between the inverting terminal of the amplifier (3) and the output terminal also increases, and the function of AVP is thus realized. However, in this prior art, since the Ifb and Rfb have their own temperature coefficient, the output voltage will change with temperature. In order to overcome this issue, Rfb is replaced by a compensation circuit to compensate the temperature coefficient of Ifb and the temperature coefficient of the output voltage is essential zero.

However, in the design of the voltage converter circuit, it is a usual technique to detect change on temperature for realizing over-temperature protection (OTP) or other temperature-related compensations. In the above-mentioned prior arts, the problem is solved by directly compensating the temperature coefficient of the detected signal of the output current. Nonetheless, these prior art cannot be adopted in other purposes relating to temperature, and extra circuit will be needed. For example, when OTP function is required in a voltage converter circuit, a circuit disclosed in FIG. 1 will be additionally required. In FIG. 1, a negative temperature coefficient (NTC) resistor and a normal resistor are adopted as a voltage divider, which generates a voltage ratio compared with a reference voltage Vfref. When the temperature is higher than a default value, the output of the comparator change the signal state thereon to inform the voltage converter circuit shut-down to prevent from malfunction of the circuit or even unsafety issue such as burning. However the NTC resistor, which is also inevitably adopted in the above-mentioned prior art, is a special device. Hence, if the NTC resistor can be shared in the designs of different purposes, the hardware cost and size can be further saved.

SUMMARY

In view of above problems, the objective of the present invention is to provide a temperature detecting circuit and method with less hardware requirement and capable of detecting current and temperature at the same time.

In one embodiment, a temperature detecting circuit is disclosed. The temperature detecting circuit is adapted to a voltage converter circuit which operates a power switch of the voltage converter circuit to regulate energy stored in an inductor and provide energy to a load. The voltage converter circuit includes a current detecting circuit coupled to an output stage composed of the power switch and the inductor. The current detecting circuit dynamically detects an output current on the inductor and has a detecting output port outputting a current detecting signal which is proportional to the output current. The temperature detecting circuit includes a current signal processing unit and a temperature calculating unit.

The current signal processing unit includes a signal input port, a first detecting output node and a second detecting output node. The signal input port is coupled to the detecting output port. A first processing signal having a first temperature coefficient is generated on the first detecting output node. A second processing signal having a second temperature coefficient, which is different from the first temperature coefficient, is generated on the second detecting output node. The first processing signal and the second processing signal are proportional to the current detecting signal. The temperature calculating unit includes two input nodes coupling to the first detecting output node and the second detecting output node respectively and performs calculation on the first processing signal and the second processing signal to derive a temperature value.

In another embodiment, a temperature detecting circuit is disclosed. The temperature detecting circuit is adapted to a voltage converter circuit which operates a power switch of the voltage converter circuit to regulate energy stored in an inductor and provide energy to a load. The power switch and the inductor form an output stage having an output current. The temperature detecting circuit comprises a current signal processing unit and a temperature calculating unit.

The current signal processing unit includes a signal input port, a first detecting output node and a second detecting output node. The signal input port is coupled to the output stage to detect the output current. A first processing signal having a first temperature coefficient is generated on the first detecting output node. A second processing signal having a second temperature coefficient, different from the first temperature coefficient, is generated on the second detecting output node. The first processing signal and the second processing signal are proportional to the current detecting signal. The temperature calculating unit includes two input nodes coupling to the first detecting output node and the second detecting output node respectively and performs calculation on the first processing signal and the second processing signal to derive a temperature value.

In still another embodiment, a temperature detecting method is disclosed. The temperature detecting method is adapted to a voltage converter circuit and includes the following steps:

Firstly, detect a load current of the voltage converter circuit by a current detecting circuit and generate a current detecting signal accordingly having a detecting signal temperature coefficient. Then, receive the current detecting signal by a current signal processing unit and generate a first processing signal and a second processing signal accordingly having a first temperature coefficient and a second temperature coefficient respectively, wherein the first temperature coefficient is different from the second temperature coefficient. Finally, receive the first processing signal and the second processing signal by a temperature calculating unit, and perform calculation accordingly to derive a temperature value.

The present invention is advantageous because the current detection and the temperature detection can be realized at the same time with less hardware requirement by detecting the output current of the voltage converter circuit and generating accordingly two processing signals with difference temperature coefficients. Therefore, the hardware cost and size can be reduced.

BRIEF DESCRIPTION OF THE DRAWINGS

These and other objectives of the present invention will no doubt become obvious to those of ordinary skill in the art after reading the following detailed description of the preferred embodiments that is illustrated in the various figures and drawings, in which.

DETAILED DESCRIPTION OF THE EMBODIMENTS

In the description hereinafter, the term of "coupled" or "coupling" refers to any two objects directly or indirectly electrically connected to each other. Therefore, if it is described that "a first device is coupled to a second device," the meaning is that the first device is either directly electrically connected to the second device or indirectly electrically connected to the second device through other devices or connection means.

Figure 1:
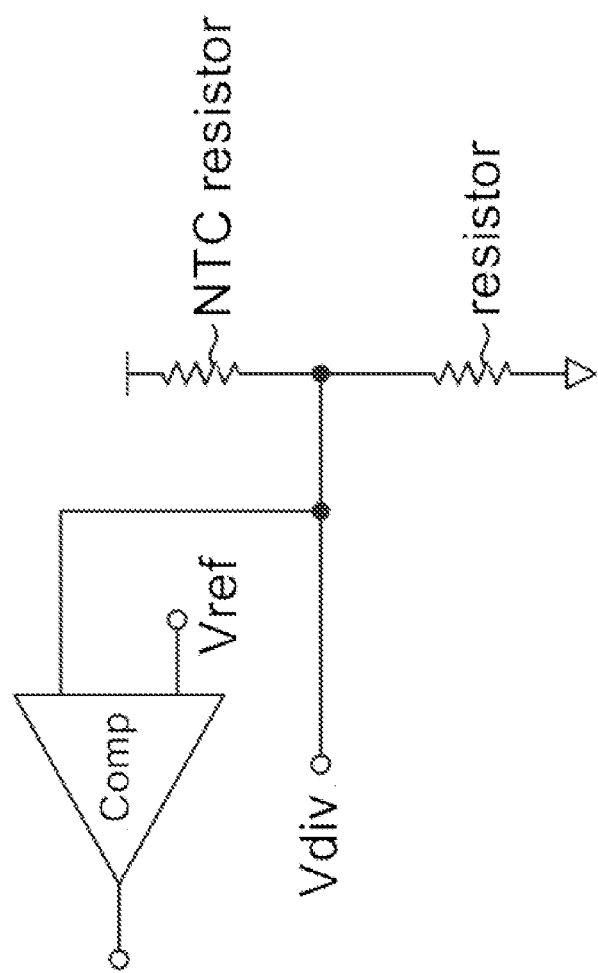
FIG. 1 is an over-temperature protection circuit of prior art.
Figure 2:
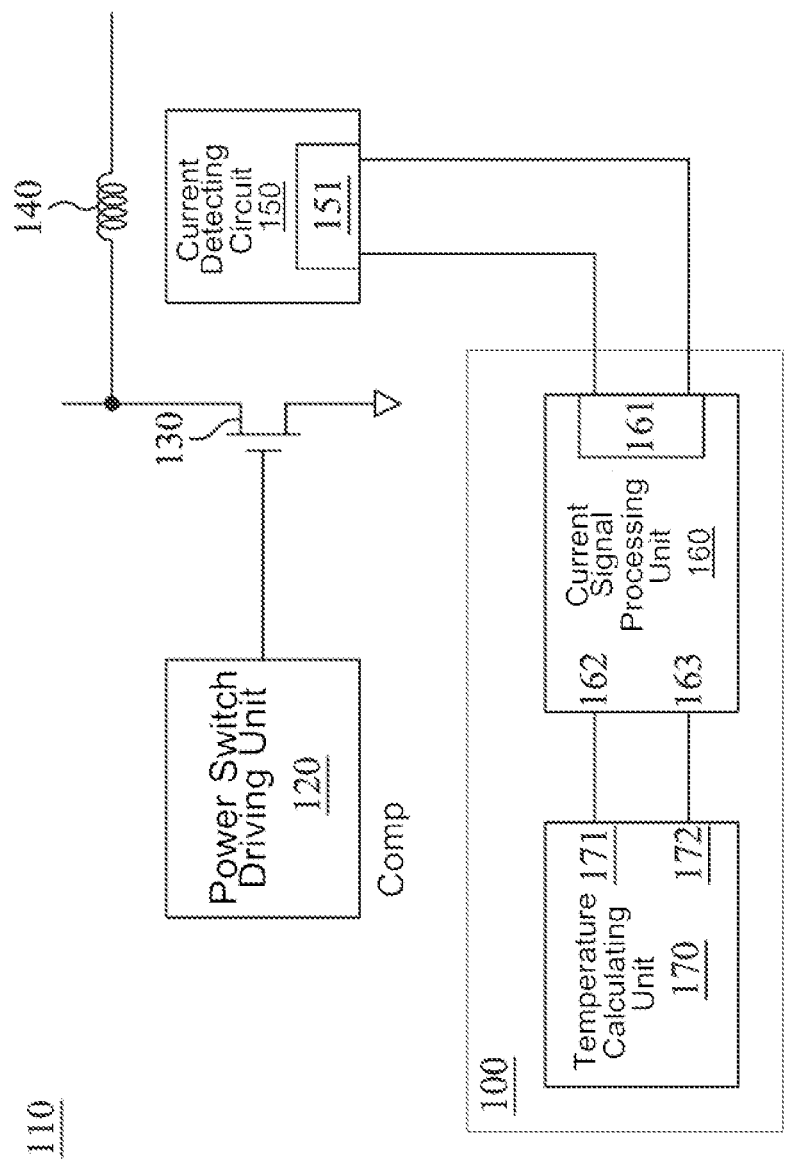
FIG. 2 is a circuit block diagram of a temperature detecting circuit of the first embodiment of the present invention and a voltage converter circuit adopting the first embodiment.

FIG. 2 is a circuit block diagram of a temperature detecting circuit 100 of the first embodiment of the present invention and a voltage converter circuit 110 adopting the first embodiment. Instead of showing a completed voltage converter circuit, only a necessary part is presented in FIG. 2 which is sufficient to interpret the present invention. The voltage converter circuit 110 can be a flyback switching power converter, a boost switching power converter, or a buck switching power converter, in which an input voltage is increased or decreased to become a direct-current (DC) output voltage which drives a load coupled to an output node. The voltage converter circuit 110 adopts a feedback circuit (not shown in FIG. 2) which determines a duty cycle of the conducting of the channel of a power switch 130 to regulate energy stored on the inductor 140 and provide energy to the load. A power switch driving unit 120 generates a driving voltage or a driving current required by the power switch 130 to control the channel of the power switch 130 conducting or cut-off. A current detecting circuit 150 is coupled to an output circuit stage, which is composed of the power switch 130 and the inductor 140, and dynamically detects an output current on the inductor 140. The current detecting circuit 150 has a detecting output port 151 outputting a current detecting signal which is proportional to the output current and has a detecting signal temperature coefficient.

As shown in FIG. 2, the temperature detecting circuit 100 includes a current signal processing unit 160 and a temperature calculating unit 170. The current signal processing unit 160 includes a signal input port 161, a first detecting output node 162, and a second detecting output node 163. The signal input port 161 is coupled to the detecting output port 151. A first processing signal having a first temperature coefficient is generated on the first detecting output node 162. A second processing signal having a second temperature coefficient, which is different from the first temperature coefficient, is generated on the second detecting output node 163. The first processing signal and the second processing signal are proportional to the current detecting signal. The temperature calculating unit 170, which includes two input nodes 171, 172 coupling to the first detecting output node 162 and the second detecting output node 163 respectively, performs calculation on the first processing signal and the second processing signal to derive a temperature value.

Figure 3:
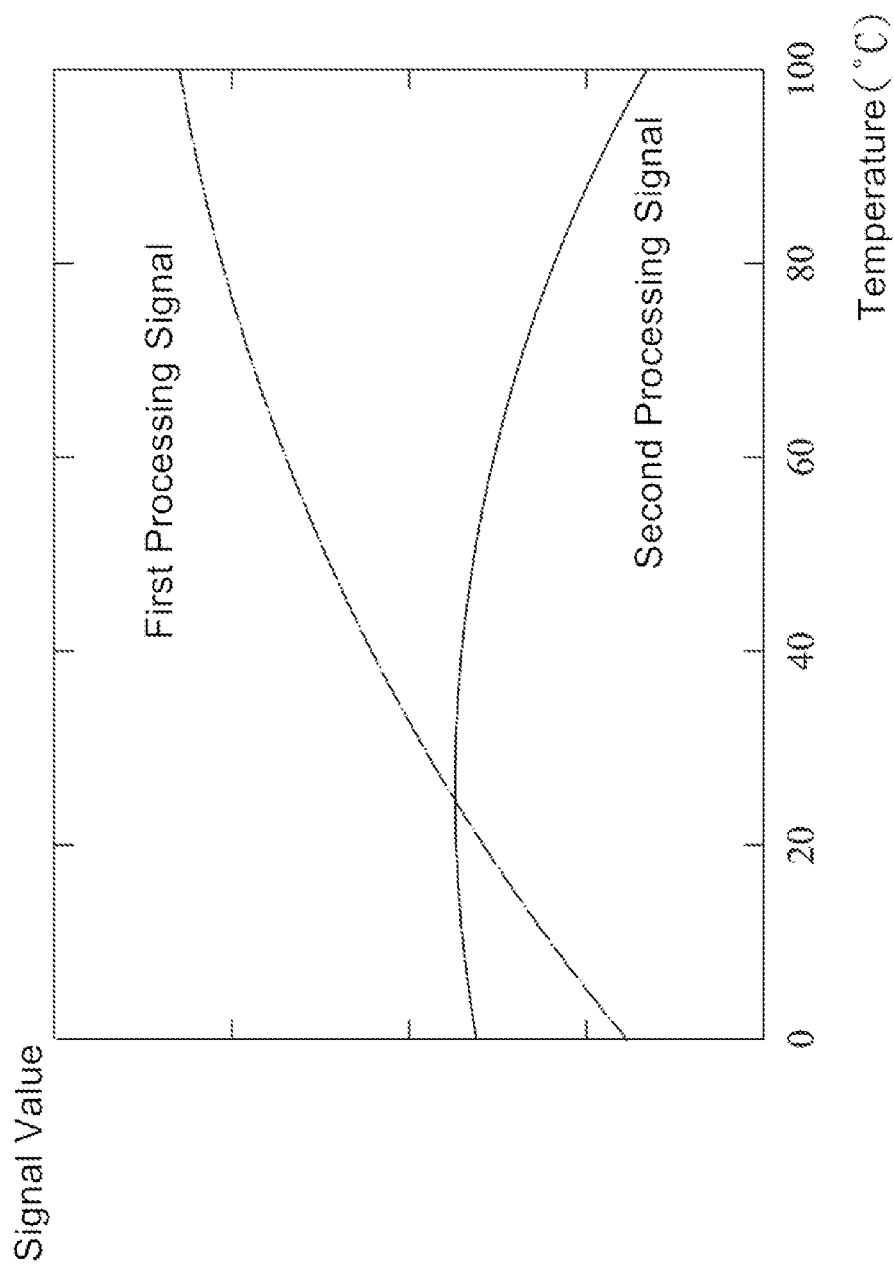
FIG. 3 is a plot showing the curves of the first processing signal and the second processing signal of the present invention versus the temperature.

FIG. 3 is a plot showing the curves of the first processing signal and the second processing signal versus the temperature. The two curves shown in FIG. 3 can be approximated by first-ordered functions with acceptable error. Assume the output current is $I_d$, which is detected by the current detecting circuit 150 and subsequently processed by the current signal processing unit 160 to generate the first processing signal $S_1$ and the second processing signal $S_2$ having a first temperature coefficient $\alpha_1$ and a second temperature coefficient $\alpha_2$ respectively. Then the first-ordered functions showing $S_1$ and $S_2$ versus temperature T can be expressed as followed:

$$S_1(T) \approx I_d \cdot R_i \cdot (1 + \alpha_1 \cdot (T-25)) \qquad (1)$$

$$S_2(T) \approx I_d \cdot R_i \cdot (1 + \alpha_2 \cdot (T-25)) \qquad (2)$$

In the above two functions, $R_i$ is the gain of the current detecting circuit 150. In this embodiment, $I_d$ and T are unknown, $\alpha_1$ and $\alpha_2$ are design parameters, and $S_1$ and $S_2$ can be derived by post-processing of the temperature calculating unit 170, such as converted by an analog-to-digital converter therein. Hence, by solving the simultaneous equations formed by equation 2 (1) and (2), the solutions of $I_d$ and T can be expressed as followed:

$$I_d = \frac{\alpha_1}{\alpha_1 - \alpha_2} \cdot \frac{S_2(T)}{R_i} - \frac{\alpha_2}{\alpha_1 - \alpha_2} \cdot \frac{S_1(T)}{R_i} \qquad (3)$$

$$T = 25 + \frac{S_1(T) - S_2(T)}{\alpha_1 \cdot S_2(T) - \alpha_2 \cdot S_1(T)} \qquad (4)$$

Therefore, the temperature value can be obtained by the equation (4), and OTP or other temperature-related compensation can be performed accordingly. At the same time, the output current can be derived by the equation (3), and corresponding controls of the voltage converter circuit can be performed, such as current feedback control, the adaptive voltage positioning, optimized phase number determination in a multi-phase voltage converter circuit, or over-current protection; wherein current feedback control can further improve transient response of the voltage converter circuit, and optimized phase number determination can optimized converting efficiency according to output current.

It is worth noting that in this embodiment although the curves are approximated with first-ordered functions, they can also be approximated by second-ordered, higher than second-ordered, or piece-wise linear functions. And the numerical analysis can then be adopted to derive the solutions of the output current and the temperature value. It is easy for people in the skill to determine the order of the approximated function and the way to derive the solution according to the application requirement and the cost consideration on design.

Furthermore, the second temperature coefficient $\alpha_2$ can be designed to be essential zero. Hence, the second processing signal can be directly representative of the output current, and the temperature value can be derived by substituting $\alpha_2$ with zero into equation (4). Besides, since the second processing signal is an analog signal, it can be directly fed back to analog circuit and adopted in such as current feedback control, the adaptive voltage positioning, optimized phase number determination in a multi-phase voltage converter circuit, or over-current protection in the voltage converter circuit. By directly feeding back the analog signal representative of the output current, the phase lag in the loop phase of the closed-loop feedback control can be further reduced to prevent from insufficient loop stability.

Figure 4A:
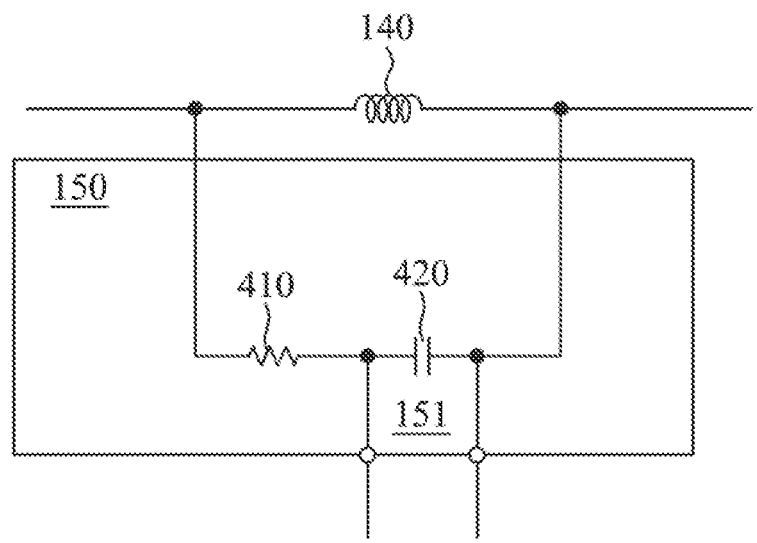
FIG. 4A is a circuit block diagram of an embodiment of a current detecting circuit of the temperature detecting circuit of the first embodiment of the present invention.

FIG. 4A is a circuit block diagram of an embodiment of a current detecting circuit 150 of the temperature detecting circuit 100 of the first embodiment of the present invention. The current detecting circuit 150 is composed of the serial link of a detecting resistor 410 and a detecting capacitor 420 and is shunt to the inductor 140, and the both terminals of the detecting capacitor 420 forms the detecting output port 151, on which the voltage $V_{151}$ is the current detecting signal. Assume the inductance of the inductor 140 is L, the parasitic resistance of the inductor 140 is $R_L$, the resistance of the detecting resistor 410 is $R_1$, and the capacitance of the detecting capacitor 420 is C. If the following equation (5) is true, the current detecting signal $V_{151}$ is proportional to the output current $I_{out}$ as shown in equation (6):

$$L/R_L = R_1 C \qquad (5)$$

$$V_{151} = R_L \cdot I_{OUT} \qquad (6)$$

However, each of the above-mentioned parameters has its own temperature coefficient, which leads to a corresponding temperature coefficient of the current detecting signal. That is to say, although the output current is fixed, the current detecting signal will be different under different temperature. In real implementation, the current detecting signal can often approximated by a first-ordered function of positive temperature coefficient in the form of the one shown as equation (1) or (2). The positive temperature coefficient will combined with the first temperature coefficient $\alpha_1$ and a second temperature coefficient $\alpha_2$ and be processed altogether in equation (1) and (2). Hence, it is unnecessary on design to specifically deal with the temperature coefficient of the current detecting signal generated by the current detecting circuit 150. Unlike the current detecting circuits of prior arts, in which the temperature coefficient of the current detecting signal should be compensated to be essentially zero, the special devices, such as NTC resistors, are not required in the current detecting circuit of the present invention. And the hardware cost and size can be further saved.

Figure 4B:
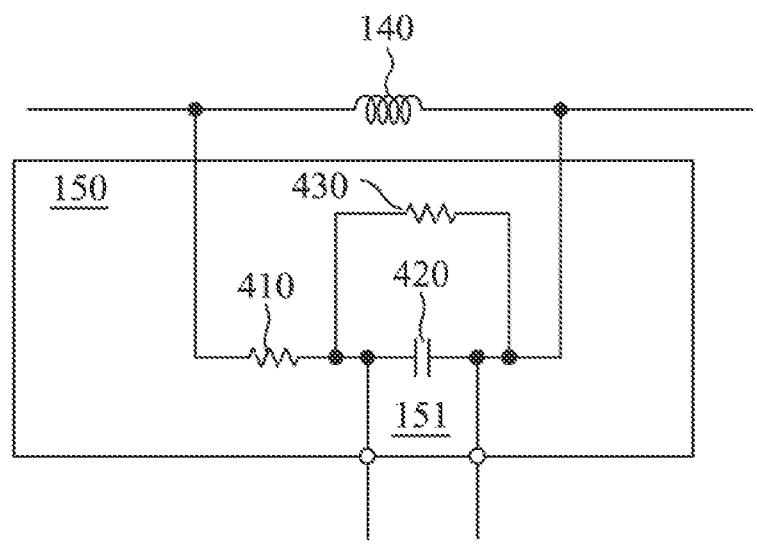
FIG. 4B is a circuit block diagram of another embodiment of a current detecting circuit of the temperature detecting circuit of the first embodiment of the present invention.

FIG. 4B is a circuit block diagram of another embodiment of a current detecting circuit 150 of the temperature detecting circuit 100 of the first embodiment of the present invention. Compared with the current detecting circuit 150 in FIG. 4A, the current detecting circuit 150 in FIG. 4B further includes a voltage dividing resistor 430 shunt to the detecting capacitor. 420. Assume the inductance of the inductor 140 is L, the parasitic resistance of the inductor 140 is $R_L$, the resistance of the detecting resistor 410 is $R_1$, the resistance of the voltage dividing resistor 430 is $R_2$, and the capacitance of the detecting capacitor 420 is C. If the following equation (7) is true, the current detecting signal $V_{151}$ is proportional to the output current $I_{out}$ as shown in equation (8):

$$L/R_L = C \cdot R_1 \cdot R_2 / (R_1 + R_2) \qquad (7)$$

-continued $$V_{151} = R_L \cdot I_{OUT} \cdot \frac{R_2}{R_1 + R_2} \qquad (8)$$

In equation (8), an additional term, which is a dividing ratio formed by $R_1$ and $R_2$, is shown compared with equation (6). Hence, when the current detecting signal 150 is adopted to detect somewhat larger output current, such as of hundreds of milli-amperes or even several amperes, the design on the dividing ratio formed by $R_1$ and $R_2$ can comply the current detecting signal $V_{151}$ with the acceptable input dynamic range of the current signal processing unit 160, in case the input signal of the current signal processing unit 160 is saturated and malfunction is caused.

Figure 5:
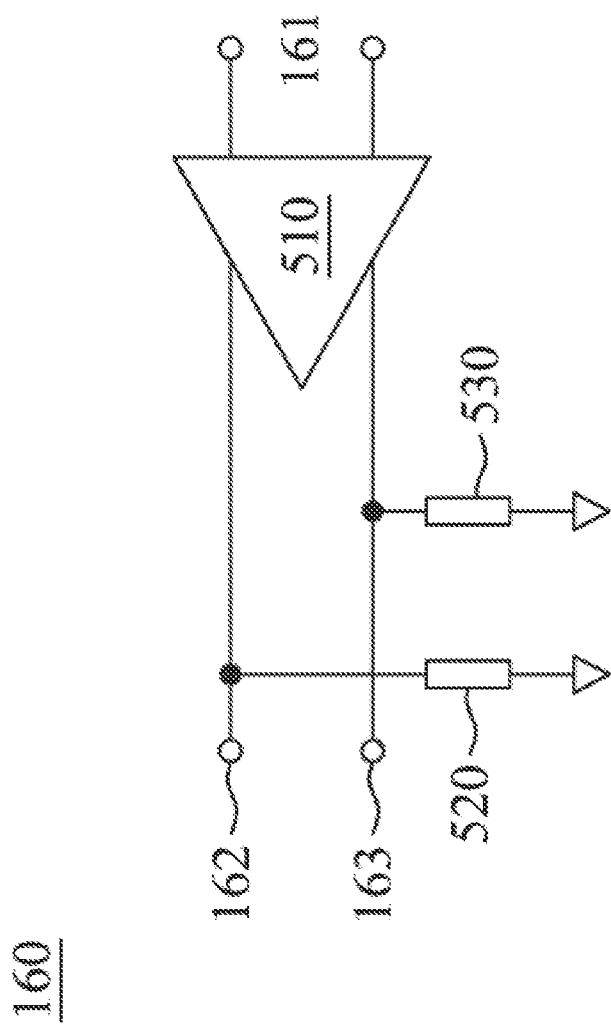
FIG. 5 is a circuit block diagram of a current signal processing unit of the temperature detecting circuit of the first embodiment of the present invention.

FIG. 5 is a circuit block diagram of a current signal processing unit 160 of the temperature detecting circuit 100 of the first embodiment of the present invention. The current signal processing unit 160 includes a current generating unit 510, a first resistance circuit 520, and a second resistance circuit 530.

As shown in FIG. 5, the current generating unit 510 receives the signal on the signal input port 161 and generates a first current signal and a second current signal, both of which are in the form of current and proportional to the signal on the signal input port 161, on the first detecting output port 162 and the second detecting output port 163 respectively. The first resistance circuit 520, which is formed by passive devices and has a resistance of a first resistance temperature coefficient, is coupled to the first detecting output node 162. The first current signal flows through the first resistance circuit 520 to form the first processing signal. The second resistance circuit 530, which is also formed by passive devices and has a resistance of a second resistance temperature coefficient, is coupled to the second detecting output node 163. The second current signal flowing through the second resistance circuit 530 to form the second processing signal. Note that the second resistance temperature coefficient is different from the first resistance temperature coefficient.

Besides, it is worth noting that the requirement on the update rate of temperature detection is often slow, which is on the order of ten times a second. Hence, the first current signal and the second current signal are not limited to be generated at the same time. For example, only one current source can be adopted and selectively coupled to either the first resistance circuit 520 or the second resistance circuit 530 by a multiplexer to generate the first processing signal or the second processing signal correspondingly. Note that the design of generating the first current signal and the second current signal is well known to people in the skill and can be determined according to the application requirement and the cost consideration on design after understanding the disclosed embodiments of the invention.

Further, by the choices of the devices and the design on the circuit topology, the temperature coefficient of the second resistance circuit 530 can be designed to compensate that of the second current signal, resulting in the temperature coefficient of the second processing signal to be essential zero. For example, the second resistance circuit 530 is a NTC resistor. As mentioned above, the second current signal of the essential zero temperature coefficient can be directly fed back to analog circuit and adopted in such as current feedback control or the adaptive voltage positioning. Hence, compared to the prior art, the circuit disclosed in this invention requires only one special device to realize current detection and temperature detection at the same time, by which the hardware cost and size are reduced.

Figure 6:
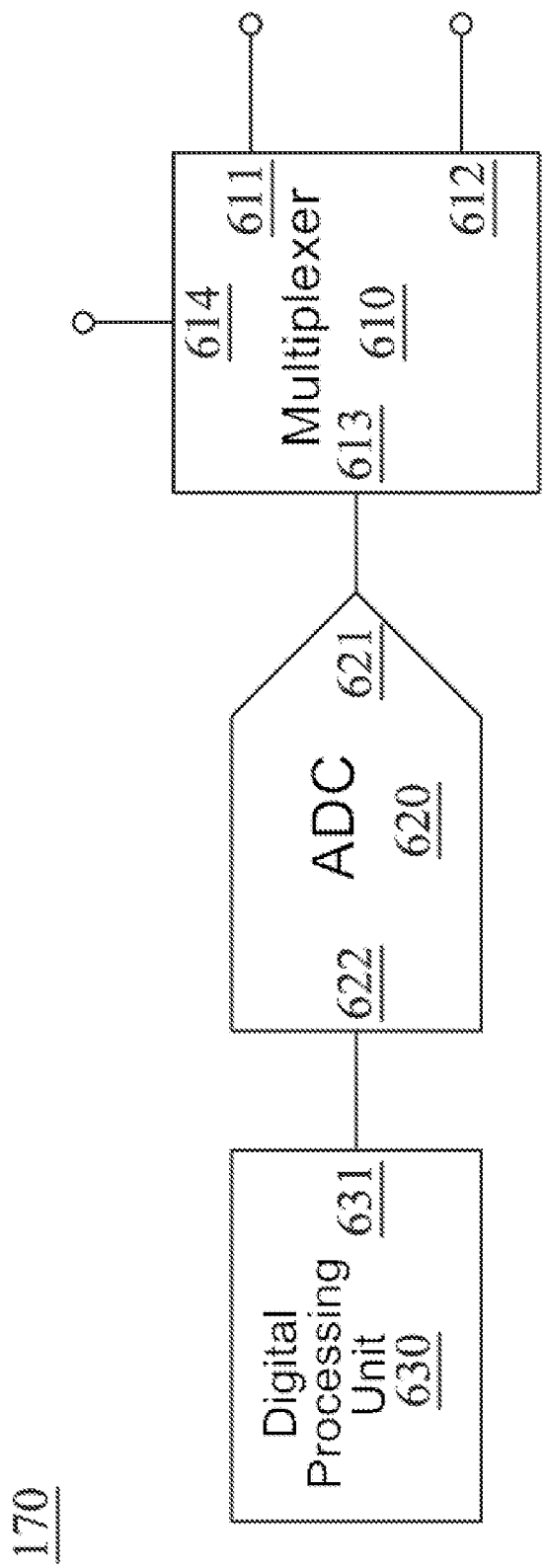
FIG. 6 is a circuit block diagram of a temperature calculating unit of the temperature detecting circuit of the first embodiment of the present invention.

FIG. 6 is a circuit block diagram of a temperature calculating unit 170 of the temperature detecting circuit 100 of the first embodiment of the present invention. It is required in temperature calculation that to substitute the first processing signal and the second processing signal into equation (4). Thanks to the technical progress on digital signal processing (DSP) circuit and the hardware cost drop, it is the best mode for the temperature calculating unit 170 of the present disclosure to implement it in digital signal processing way by such as DSP or microcontroller. Nonetheless, the implementation of the temperature calculating unit 170 is not limited to those described above. It is easy for people in the skill to realize the temperature calculating unit 170 according to the application requirement and the cost consideration on design after understanding the disclosed embodiments of the invention.

As shown in FIG. 6, the temperature calculating unit 170 includes a multiplexer 610, an analog-to-digital converter 620, and a digital processing unit 630. The multiplexer 610 includes a control node 614, a first mux-input node 611, a second mux-input node 612, and a mux-output node 613. The first mux-input node 611 is coupled to the first detecting output node 162 of the current signal processing unit 160. The second mux-input node 612 is coupled to the second detecting output node 163 of the current signal processing unit 160. The multiplexer 610 selectively couples the mux-output node 613 to one of the first mux-input node 611 and the second mux-input node 612 according to a control signal received by the control node 614.

In more detail, the analog-to-digital converter 620 includes an analog input node 621 and a digital output port 622. The analog input node 621 is coupled to the mux-output node 613. The analog-to-digital converter 620 linearly converts the signal on the analog input node 621 to a digital signal on the digital output port 622. The digital processing unit 630 includes a digital input port 631 coupled to the digital output port 622 and performs calculation on the first processing signal and the second processing signal to derive the temperature value, such as substituting the first processing signal and the second processing signal into equation (4) to derive the temperature value.

Figure 7:
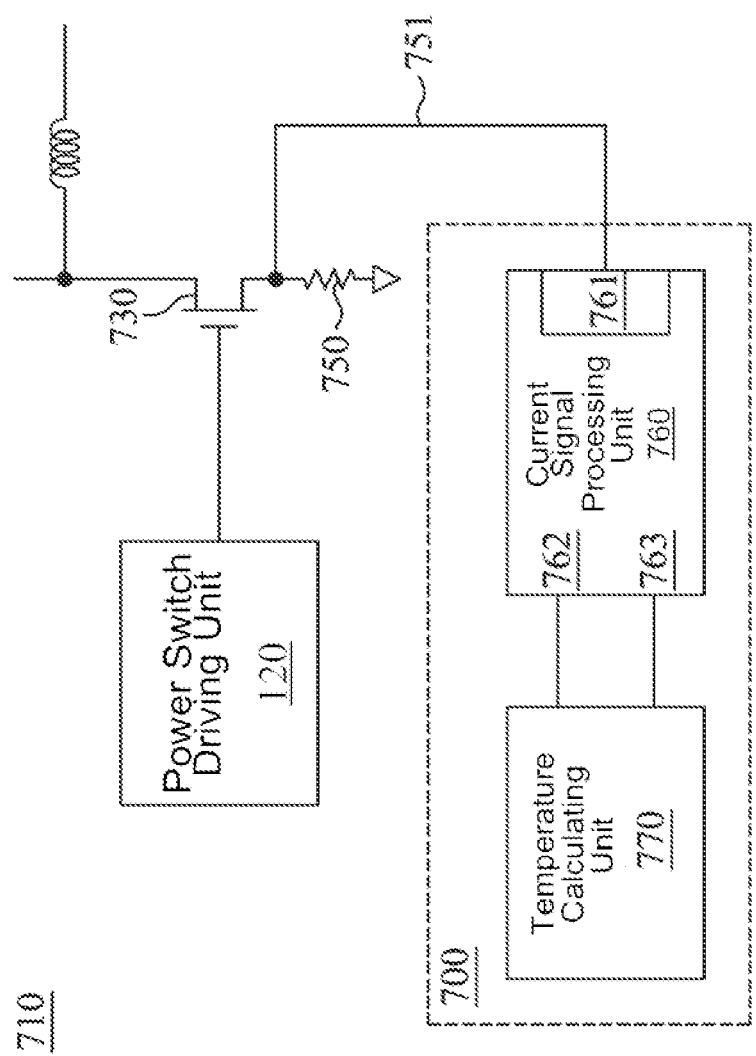
FIG. 7 is a circuit block diagram of a temperature detecting circuit of the second embodiment of the present invention and a voltage converter circuit adopting the second embodiment.

FIG. 7 is a circuit block diagram of a temperature detecting circuit 700 of the second embodiment of the present invention and a voltage converter circuit 710 adopting the second embodiment. The temperature detecting circuit 700, the current signal processing unit 760 and the temperature calculating unit 770 can be referred to the related descriptions of the temperature detecting circuit 100, the current signal processing unit 160 and the temperature calculating unit 170 respectively. The voltage converter circuit 710 can be a flyback switching power converter, a boost switching power converter, or a buck switching power converter. The difference between the voltage converter circuit 710 and the voltage converter circuit 110 is that a current detecting serial resistor 750 is adopted as an embodiment of the current detecting circuit in the voltage converter circuit 710. The current detecting serial resistor 750 is serially connected to the power switch 730 through the detecting output port 751, on which the voltage is the current detecting signal when the channel of the power switch 730 is conducting. Since the current detecting serial resistor 750 has a temperature coefficient, which is usually larger than zero, the current detecting signal also has a non-zero temperature coefficient.

As shown in FIG. 7, when the current signal processing unit 760 generates a first processing signal and a second processing signal on a first detecting output port 762 and a second detecting output port 763 respectively according to the current detecting signal received by a signal input port 761, the temperature coefficient of the current detecting signal will be combined into those of the first processing signal and the second processing signal. Also from the description of the first embodiment of the present invention it is known that the output current and the temperature value can be derived from equation (3) and (4), thus it is unnecessary to adjust the temperature coefficient of the current detecting signal on design. That is to say, the temperature coefficient of the current detecting serial resistor 750 is considered together with those of the first processing signal and the second processing signal, and is also unnecessary to be adjusted on design.

Figure 8:
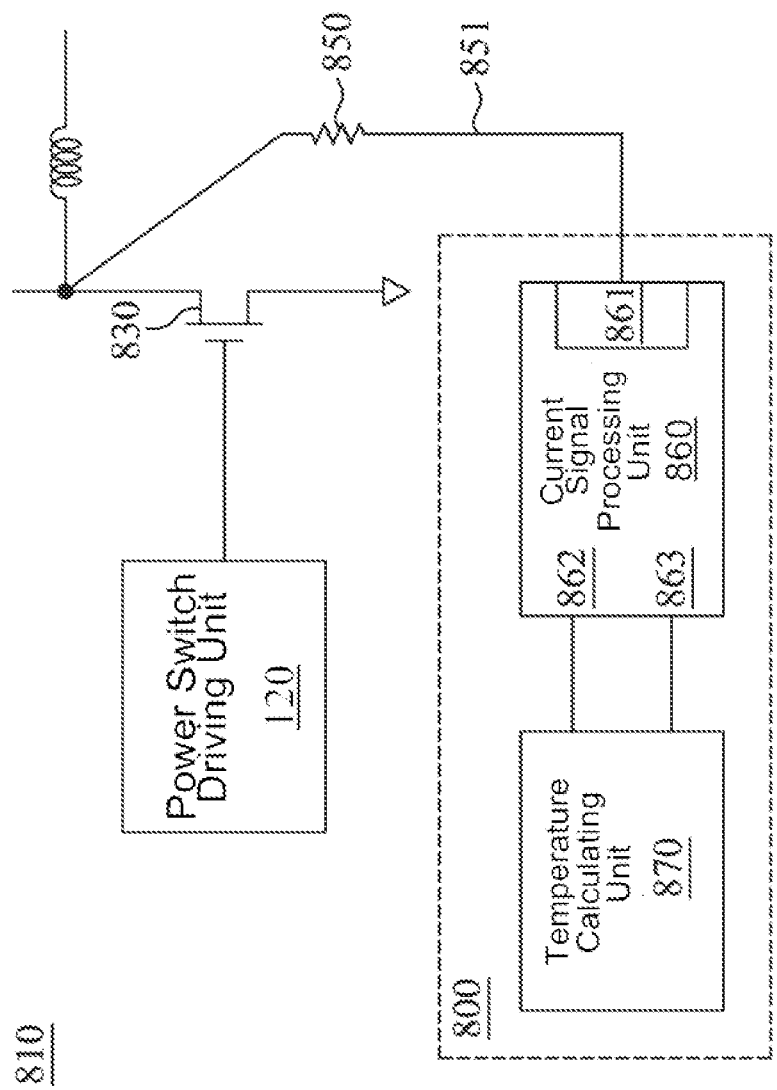
FIG. 8 is a circuit block diagram of a temperature detecting circuit of the third embodiment of the present invention and a voltage converter circuit adopting the third embodiment.

FIG. 8 is a circuit block diagram of a temperature detecting circuit 800 of the third embodiment of the present invention and a voltage converter circuit 810 adopting the third embodiment. The temperature detecting circuit 800, the current signal processing unit 860 and the temperature calculating unit 870 can be referred to the related descriptions of the temperature detecting circuit 100, the current signal processing unit 160 and the temperature calculating unit 170 respectively. The voltage converter circuit 810 can be a flyback switching power converter, a boost switching power converter, or a buck switching power converter. The difference between the voltage converter circuit 810 and the voltage converter circuit 110 is that a current detecting shunt resistor 850 is adopted as an embodiment of the current detecting circuit in the voltage converter circuit 810. One terminal of the current detecting shunt resistor 850 is coupled to one terminal of the channel of the power switch 830, and the other terminal of the current detecting shunt resistor 850 forms the detecting output port 851, on which the current flowing through is the current detecting signal when the channel of the power switch 830 is conducting.

In more detail, the current signal processing unit 860 can bias the current detecting output port 851 at a fixed voltage level, such as ground voltage. When the channel of the power switch 830 is conducting, a current, which is the current detecting signal, is generated on the current detecting shunt resistor 850. The current detecting signal is proportional to the current on the channel of the power switch 830 and received by the current signal processing unit 860 through the signal input port 861.

Nonetheless, when the channel of the power switch 830 is conducting, the effective resistance of the channel has a temperature coefficient, which renders the current detecting signal also having a temperature coefficient. When the current signal processing unit 860 generates a first processing signal and a second processing signal on a first detecting output port 862 and a second detecting output port 863 respectively according to the current detecting signal received by the signal input port 861, the temperature coefficient of the current detecting signal will be combined into those of the first processing signal and the second processing signal. Also from the description of the first embodiment of the present invention it is known that the output current and the temperature value can be derived from equation (3) and (4), thus it is unnecessary to adjust the temperature coefficient of the current detecting signal on design. That is to say, the temperature coefficient of the current detecting shunt resistor 850 is considered together with those of the first processing signal and the second processing signal, and is also unnecessary to be adjusted on design.

Figure 9:
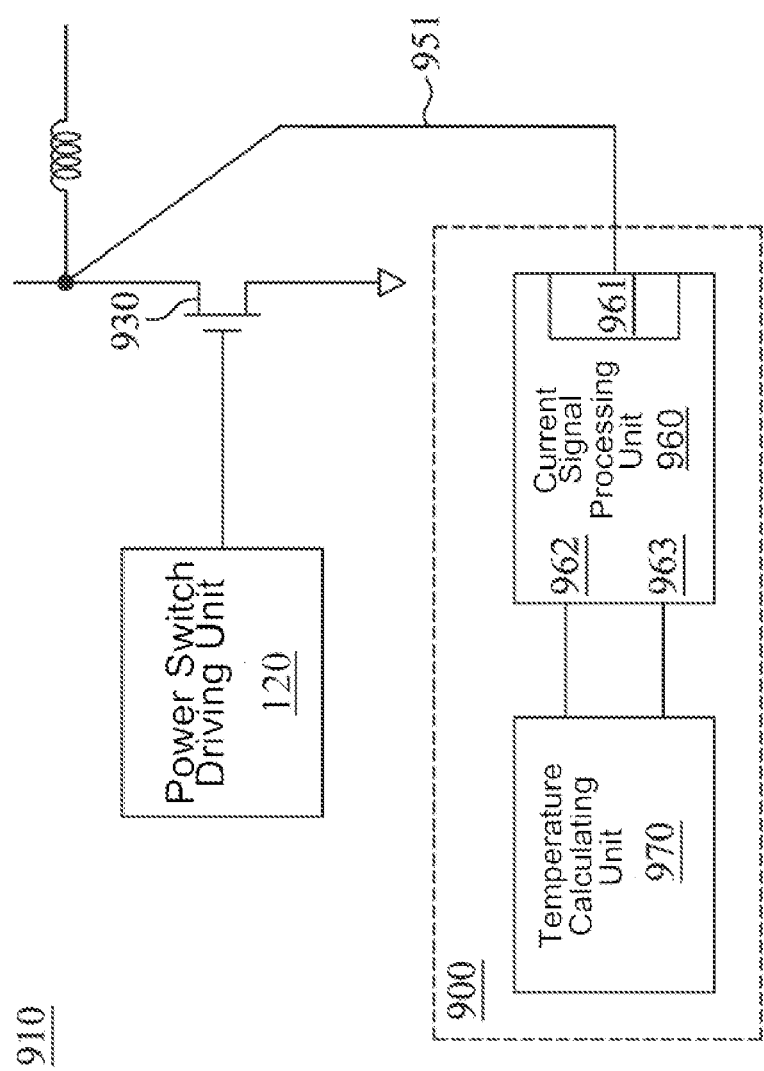
FIG. 9 is a circuit block diagram of a temperature detecting circuit of the fourth embodiment of the present invention and a voltage converter circuit adopting the fourth embodiment.

FIG. 9 is a circuit block diagram of a temperature detecting circuit 900 of the fourth embodiment of the present invention and a voltage converter circuit 910 adopting the fourth embodiment. The temperature detecting circuit 900, the current signal processing unit 960 and the temperature calculating unit 970 can be referred to the related descriptions of the temperature detecting circuit 100, the current signal processing unit 160 and the temperature calculating unit 170 respectively. The voltage converter circuit 910 can be a flyback switching power converter, a boost switching power converter, or a buck switching power converter. The difference between the voltage converter circuit 910 and the voltage converter circuit 110 is that the voltage drop of the conducting channel of the power switch 930 is directly detected as the current detecting signal, thus one terminal of the channel of the power switch 930 directly forms the current detecting output port 951. That is to say, when the channel of the power switch 930 is conducting, the output voltage of the current detecting output port 951 is the current detecting signal.

Nonetheless, when the channel of the power switch 930 is conducting, the effective resistance of the channel has a temperature coefficient, which renders the current detecting signal also having a temperature coefficient. When the current signal processing unit 960 generates a first processing signal and a second processing signal on a first detecting output port 962 and a second detecting output port 963 respectively according to the current detecting signal received by the signal input port 961, the temperature coefficient of the current detecting signal will be combined into those of the first processing signal and the second processing signal. Also from the description of the first embodiment of the present invention it is known that the output current and the temperature value can be derived from equation (3) and (4), thus it is unnecessary to adjust the temperature coefficient of the current detecting signal on design. That is to say, the temperature coefficient of the effective resistance of the channel of the power switch 930 is considered together with those of the first processing signal and the second processing signal, and is also unnecessary to be adjusted on design.

Figure 10:
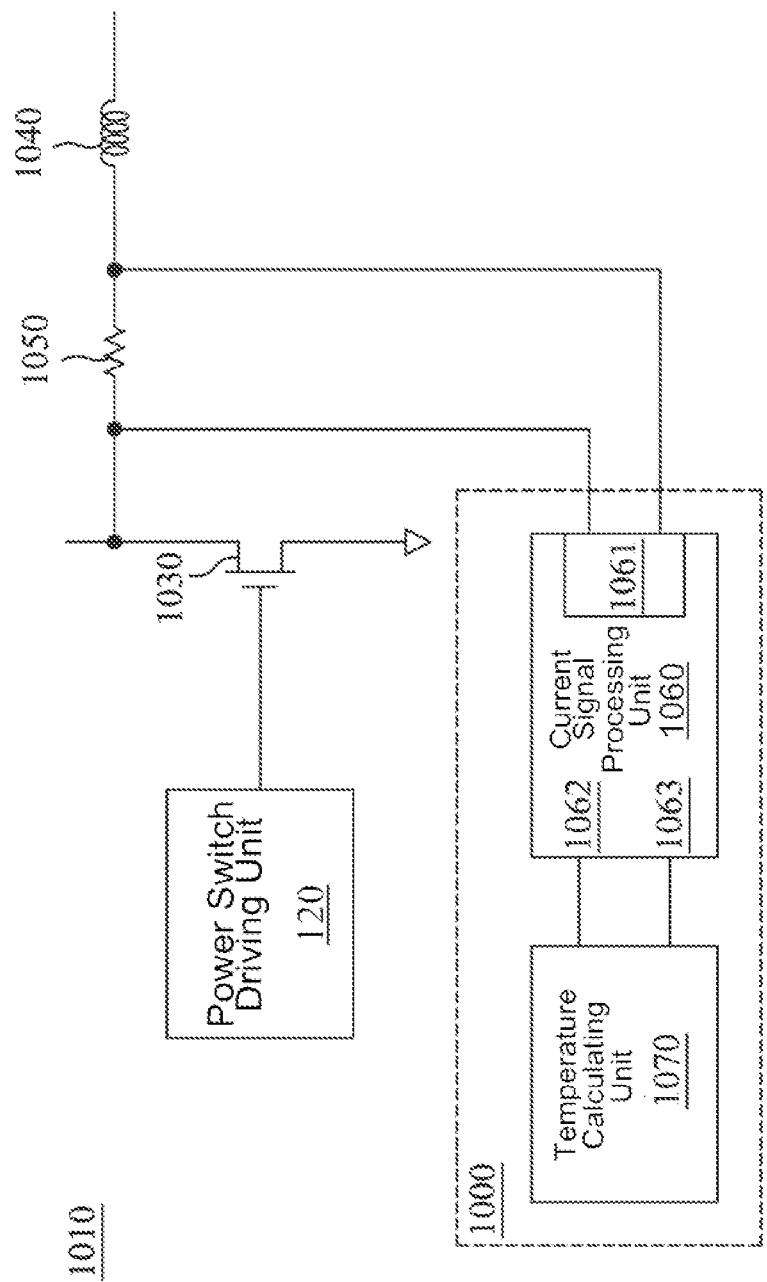
FIG. 10 is a circuit block diagram of a temperature detecting circuit of the fifth embodiment of the present invention and a voltage converter circuit adopting the fifth embodiment.
Figure 11:
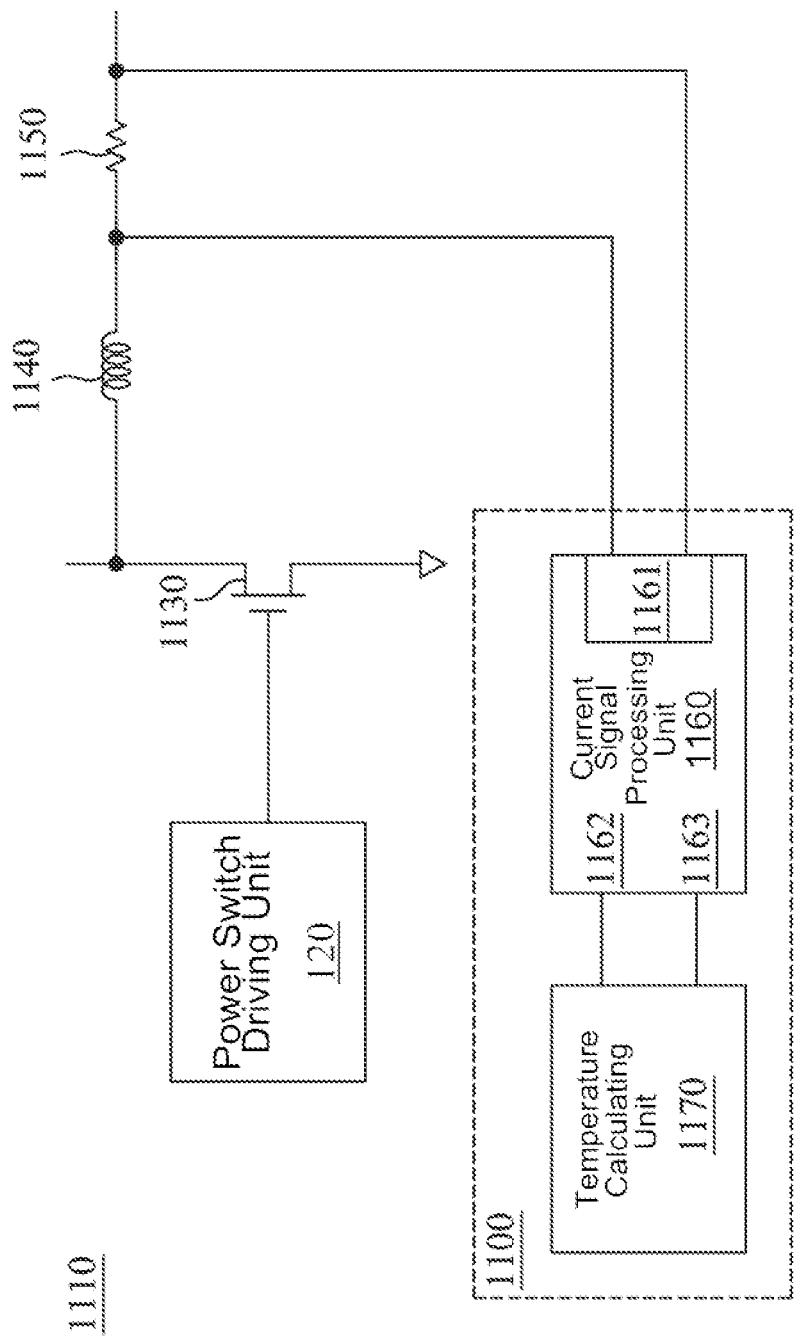
FIG. 11 is a circuit block diagram of a temperature detecting circuit of the sixth embodiment of the present invention and a voltage converter circuit adopting the sixth embodiment.

FIG. 10 is a circuit block diagram of a temperature detecting circuit 1000 of the fifth embodiment of the present invention and a voltage converter circuit 1010 adopting the fifth embodiment. FIG. 11 is a circuit block diagram of a temperature detecting circuit 1100 of the sixth embodiment of the present invention and a voltage converter circuit 1110 adopting the sixth embodiment. The temperature detecting circuits 1000 and 1100, the current signal processing units 1060 and 1160, and the temperature calculating units 1070 and 1170 can be referred to the related descriptions of the temperature detecting circuit 100, the current signal processing unit 160 and the temperature calculating unit 170 respectively. The voltage converter circuits 1010 and 1110 can be flyback switching power converters, boost switching power converters, or buck switching power converters. The voltage converter circuits 1010 and 1110 have serial resistors 1050 and 1150 respectively, which are serially connected to inductors 1040 and 1140 respectively and form a part of the path of output current. Therefore, the output current generates a voltage, which is the current detecting signal, between the both terminals of each of the serial resistors 1050 and 1150.

Nonetheless, the serial resistors 1050 and 1150 have temperature coefficients, which render the current detecting signals also having a temperature coefficient. When the current signal processing unit 1060 (or 1160) generates a first processing signal and a second processing signal on a first detecting output port 1062 (or 1162) and a second detecting output port 1063 (or 1163) respectively according to the current detecting signal received by the signal input port 1061 (or 1161), the temperature coefficient of the current detecting signal will be combined into those of the first processing signal and the second processing signal. Also from the description of the first embodiment of the present invention it is known that the output current and the temperature value can be derived from equation (3) and (4), thus it is unnecessary to adjust the temperature coefficient of the current detecting signal on design. That is to say, the temperature coefficients of the serial resistors 1050 and 1150 are considered together with those of the first processing signal and the second processing signal, and are also unnecessary to be adjusted on design.

Figure 12:
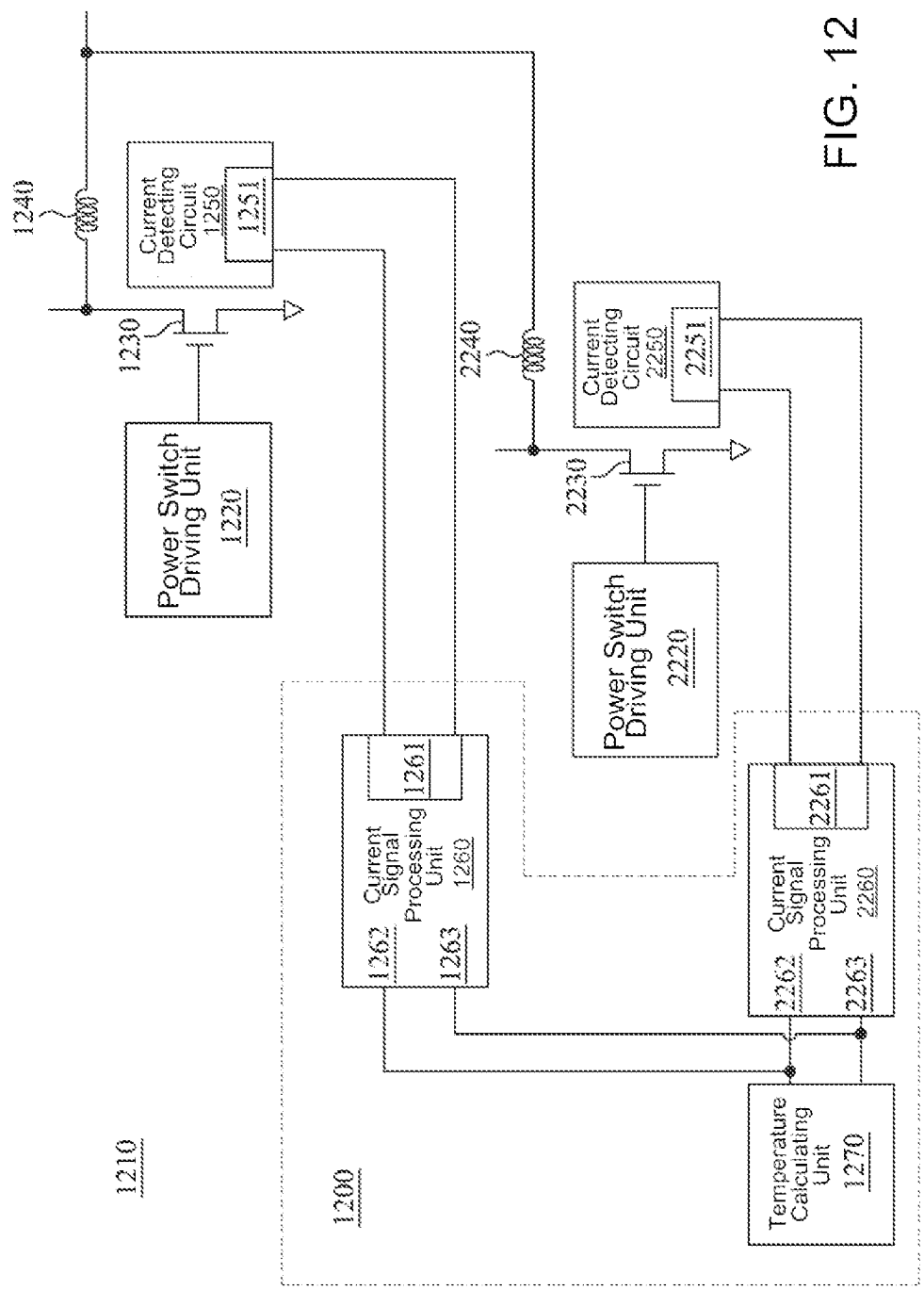
FIG. 12 is a circuit block diagram of a temperature detecting circuit of the seventh embodiment of the present invention and a voltage converter circuit adopting the seventh embodiment.

FIG. 12 is a circuit block diagram of a temperature detecting circuit 1200 of the seventh embodiment of the present invention and a voltage converter circuit 1210 adopting the seventh embodiment. The voltage converter circuit 1210 is a multi-phase voltage converter circuit, which is different from the single-phase voltage converter circuits in the aforementioned embodiments. The voltage converter circuit 1210 adopts a first phase converting circuit, which is composed of a power switch driving unit 1220, a power switch 1230 and an inductor 1240, and a second phase converting circuit, which is composed of a power switch driving unit 2220, a power switch 2230 and an inductor 2240. The output terminal of the inductor 1240 is coupled to that of the inductor 2240. A phase difference is generated on the operation of the first phase converting circuit and the second phase converter circuit, by which several advantages are obtained such as lowering the specification requirement of saturation current of the inductors, decreasing the voltage ripple on the output node, and diverting the points of heat dissipation. The characteristics and operation of the multi-phase voltage converter circuit is well known to people in the skill, and will not be described further hereinafter. It is worth noting that in the seventh embodiment of the present invention, a two-phase voltage converter circuit is illustrated. People in the skill can apply the present invention to other multi-phase voltage converter circuits, such as multi-phase flyback switching power converter, multi-phase boost switching power converter, or multi-phase buck switching power converter, after understanding the disclosed embodiments of the invention.

As shown in FIG. 12, the current detecting circuits 1250 and 2250 detect output currents of the first phase converting circuit and the second phase converting circuit respectively, and generate current detecting signals accordingly which are adopted to generate a first phase first current signal, a first phase second current signal, a second phase first current signal, and a second phase second current signal by the current signal processing unit 1260 and 2260 respectively. The first phase first current signal flows into a first detecting output port 2262 of the current signal processing unit 2260 through a first detecting output port 1262 of the current signal processing unit 1260, and flows into a first resistance circuit (now shown) in the current signal processing unit 2260 together with the second phase first current signal to form a first processing signal of the voltage form. The first phase second current signal flows into a second detecting output port 2263 of the current signal processing unit 2260 through a second detecting output port 1263 of the current signal processing unit 1260, and flows into a second resistance circuit (now shown) in the current signal processing unit 2260 together with the second phase second current signal to form a second processing signal of the voltage form. Then the first processing signal and the second processing signal are received by a temperature calculating unit 1270 and the output current and the temperature value are derived according to equations (3) and (4) respectively. The current signal processing units 1260 and 2260 and the temperature calculating units 127 can be referred to the related descriptions of the current signal processing unit 160 and the temperature calculating unit 170 of the first embodiment respectively. It is worth noting that in the embodiment of the multi-phase voltage converter circuit, the first resistance circuit and the second resistance circuit exist only in one of those current signal processing units. The first current signals or the second current signals generated by each phase are summed by directing wiring the first detecting output ports or the second detecting output ports and flowing through the first resistance circuit or the second resistance circuit to generate the first processing signal or the second processing signal of the voltage form.

Figure 13:
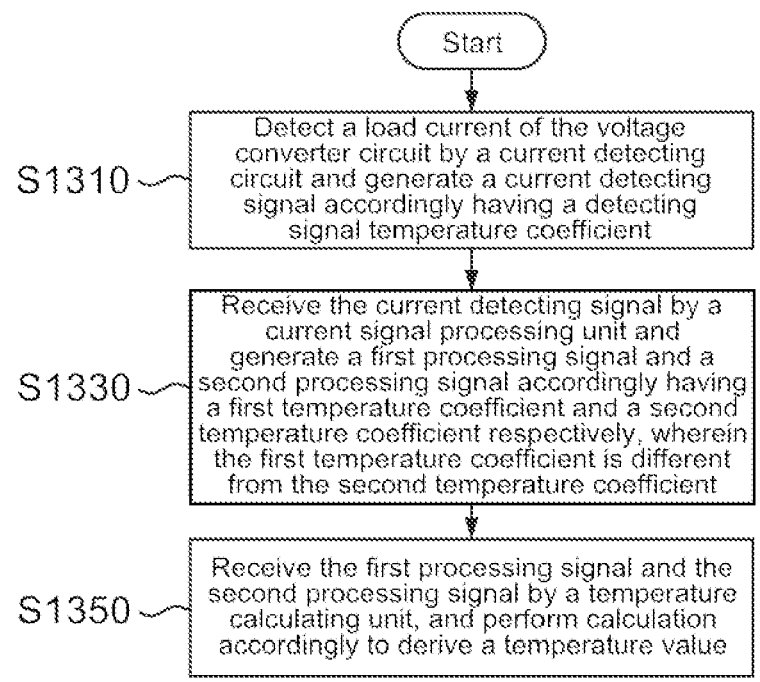
FIG. 13 is a flow chart of a temperature detecting method of the eighth embodiment of the present invention.

FIG. 13 is a flow chart of a temperature detecting method of the eighth embodiment of the present invention. The temperature detecting method is adapted to a voltage converter circuit and comprises the following steps:

As shown in step S1310, detect a load current of the voltage converter circuit by a current detecting circuit and generate a current detecting signal accordingly having a detecting signal temperature coefficient.

As shown in step S1330, receive the current detecting signal by a current signal processing unit and generate a first processing signal and a second processing signal accordingly having a first temperature coefficient and a second temperature coefficient respectively, wherein the first temperature coefficient is different from the second temperature coefficient.

As shown in step S1350, receive the first processing signal and the second processing signal by a temperature calculating unit, and perform calculation accordingly to derive a temperature value.

Figure 14:
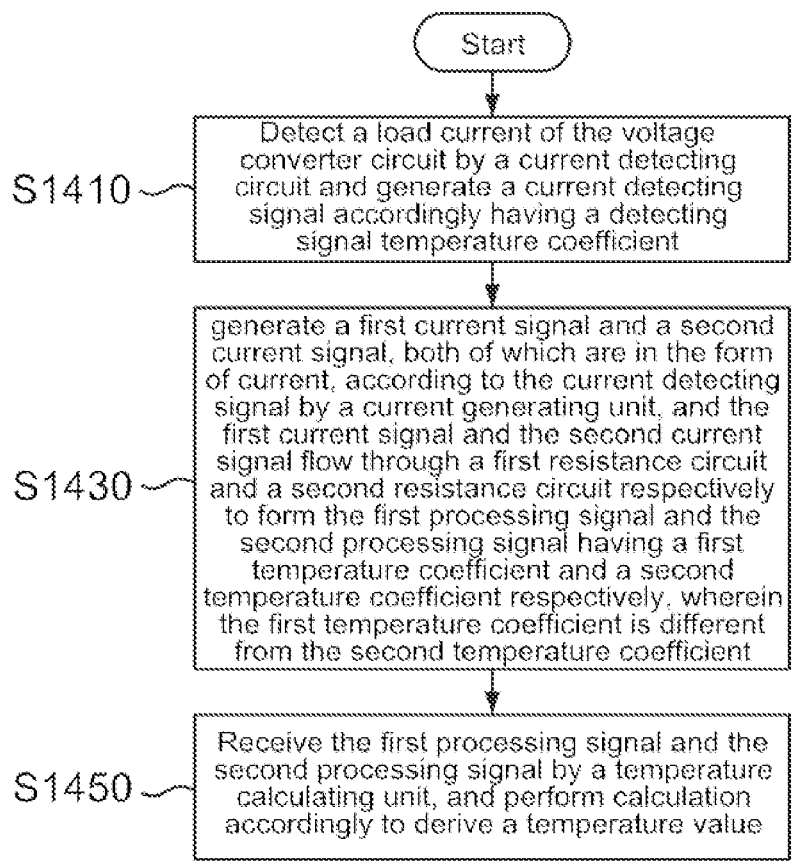
FIG. 14 is a flow chart of a temperature detecting method of the ninth embodiment of the present invention.

FIG. 14 is a flow chart of a temperature detecting method of the ninth embodiment of the present invention. The temperature detecting method is adapted to a voltage converter circuit and comprises the following steps:

Steps S1410 and S1450 can be referred to related descriptions of steps S1310 and S1350 of the eighth embodiment of the present disclosure.

As shown in step S1430, generate a first current signal and a second current signal, both of which are in the form of current, according to the current detecting signal by a current generating unit. The first current signal and the second current signal flow through a first resistance circuit and a second resistance circuit respectively to from the a processing signal and a second processing signal having a first temperature coefficient and a second temperature coefficient respectively, wherein the first temperature coefficient is different from the second temperature coefficient Besides, in the step S1430, it is can be further included that design the temperature coefficient of the second resistance circuit to render the second temperature coefficient to be essentially zero, and adapt the second processing signal for a feedback control of the voltage converter circuit, performing the adaptive voltage positioning, optimized phase number determination in a multi-phase voltage converter circuit, or over-current protection.

Figure 15:
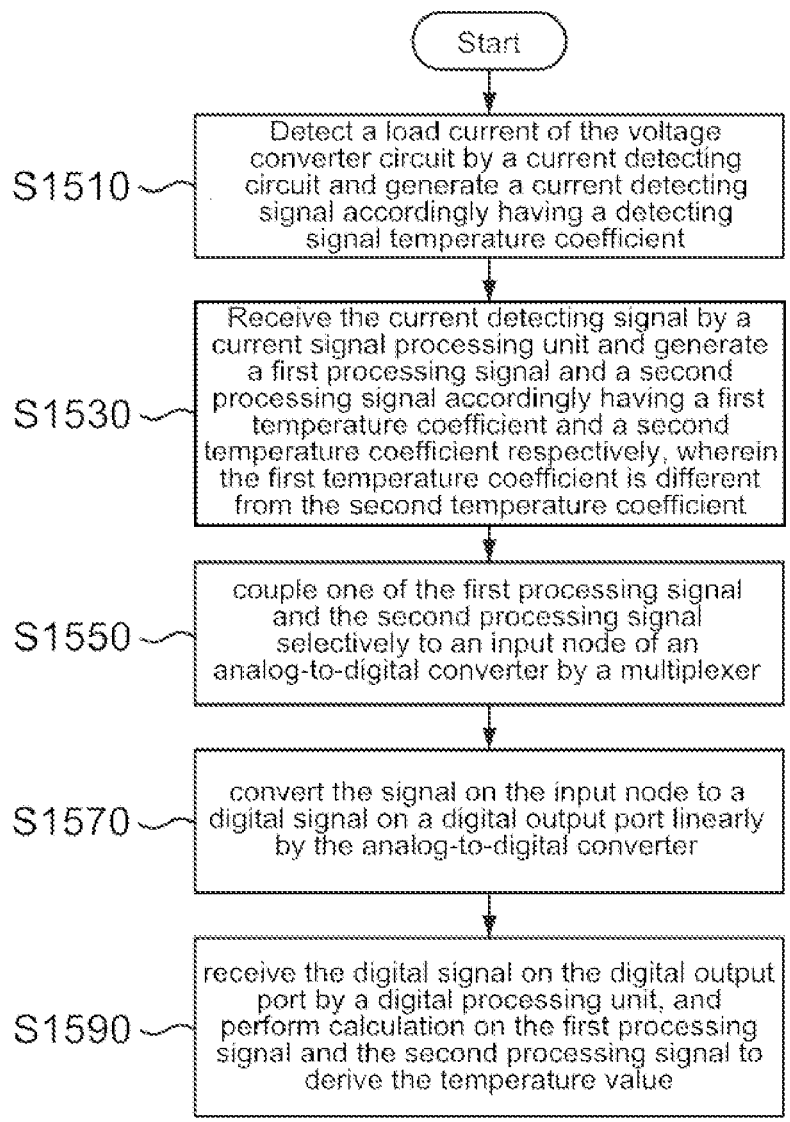
FIG. 15 is a flow chart of a temperature detecting method of the tenth embodiment of the present invention.

FIG. 15 is a flow chart of a temperature detecting method of the tenth embodiment of the present invention. The temperature detecting method is adapted to a voltage converter circuit and comprises the following steps:

Steps S1510 and S1530 can be referred to related descriptions of steps S1310 and S1330 of the eighth embodiment of the present disclosure.

As shown in step S1550, couple one of the first processing signal and the second processing signal selectively to an input node of an analog-to-digital converter by a multiplexer.

As shown in step S1570, convert the signal on the input node to a digital signal on a digital output port linearly by the analog-to-digital converter.

As shown in step S1590, receive the digital signal on the digital output port by a digital processing unit, and perform calculation on the first processing signal and the second processing signal to derive the temperature value.

The aforementioned description only represents the preferred embodiment of this invention, without any intention to limit the scope of this invention thereto. Various equivalent changes, alterations, or modifications based on the claims of this invention are all consequently viewed as being embraced by the scope of this invention.

What is claimed is:

1. A temperature detecting circuit, adapted to a voltage converter circuit which operates a power switch of the voltage converter circuit to regulate energy stored in an inductor and provide energy to a load, the voltage converter circuit including a current detecting circuit coupled to an output stage composed of the power switch and the inductor, the current detecting circuit dynamically detecting an output current on the inductor and having a detecting output port outputting a current detecting signal which is proportional to the output current, the temperature detecting circuit comprising:
   a current signal processing unit, including a signal input port, a first detecting output node and a second detecting output node, wherein the signal input port is coupled to the detecting output port, a first processing signal having a first temperature coefficient is generated on the first detecting output node, a second processing signal having a second temperature coefficient, different from the first temperature coefficient, is generated on the second detecting output node, and the first processing signal and the second processing signal are proportional to the current detecting signal; and
   a temperature calculating unit, including two input nodes coupling to the first detecting output node and the second detecting output node respectively and performing calculation on the first processing signal and the second processing signal to derive a temperature value.

2. The temperature detecting circuit of claim 1, wherein the current detecting circuit is composed of the serial link of a detecting resistor and a detecting capacitor and is shunt to the inductor, and the both terminals of the detecting capacitor forms the detecting output port, on which the voltage is the current detecting signal.

3. The temperature detecting circuit of claim 2, wherein the current detecting circuit further comprises a voltage dividing resistor shunt to the detecting capacitor.

4. The temperature detecting circuit of claim 1, wherein the current detecting circuit is formed by a current detecting serial resistor serially connected to the power switch through the detecting output port, on which the voltage is the current detecting signal when the channel of the power switch is conducting.

5. The temperature detecting circuit of claim 1, wherein the current signal processing unit further comprises:
   a current generating unit, receiving the signal on the signal input port and generating a first current signal and a second current signal, both of which are in the form of current and proportional to the signal on the signal input port, on the first detecting output port and the second detecting output port respectively;
   a first resistance circuit, coupled to the first detecting output node and having a resistance of a first resistance temperature coefficient, the first current signal flowing through the first resistance circuit to form the first processing signal; and
   a second resistance circuit, coupled to the second detecting output node and having a resistance of a second resistance temperature coefficient which is different from the first resistance temperature coefficient, the second current signal flowing through the second resistance circuit to form the second processing signal.

6. The temperature detecting circuit of claim 5, wherein the second resistance temperature coefficient is smaller than zero.

7. The temperature detecting circuit of claim 1, wherein the second temperature coefficient is essentially zero, and the second processing signal is adapted for a feedback control of the voltage converter circuit, performing the adaptive voltage positioning, optimized phase number determination in a multi-phase voltage converter circuit, or over-current protection.

8. The temperature detecting circuit of claim 1, wherein the temperature calculating unit further comprises:
   a multiplexer, including a control node, a first mux-input node, a second mux-input node, and a mux-output node, the first mux-input node coupled to the first detecting output node, the second mux-input node coupled to the second detecting output node, and the multiplexer selectively couples the mux-output node to one of the first mux-input node and the second mux-input node according to a control signal received by the control node;
   an analog-to-digital converter, including an analog input node and a digital output port, the analog input node coupled to the mux-output node, and the analog-to-digital converter linearly converting the signal on the analog input node to a digital signal on the digital output port; and
   a digital processing unit, including a digital input port coupled to the digital output port and performing calculation on the first processing signal and the second processing signal to derive the temperature value.

9. The temperature detecting circuit of claim 1, wherein the voltage converter circuit is a single-phase fly-back switching voltage converter, a single-phase boost switching voltage converter, a single-phase Buck switching voltage converter, a multi-phase fly-back switching voltage converter, a multi-phase boost switching voltage converter, or a multi-phase Buck switching voltage converter.

10. The temperature detecting circuit of claim 1, wherein the current detecting circuit is formed by a current detecting shunt resistor, one terminal of the current detecting shunt resistor is coupled to one terminal of the channel of the power switch, and the other terminal of the current detecting shunt resistor forms the detecting output port, on which current flowing through is the current detecting signal when the channel of the power switch is conducting.

11. The temperature detecting circuit of claim 10, wherein the current signal processing unit further comprises:
   a current generating unit, receiving the signal on the signal input port and generating a first current signal and a second current signal, both of which are in the form of current and proportional to the signal on the signal input port, on the first detecting output port and the second detecting output port respectively;

a first resistance circuit, coupled to the first detecting output node and having a resistance of a first resistance temperature coefficient, the first current signal flowing through the first resistance circuit to form the first processing signal; and a second resistance circuit, coupled to the second detecting output node and having a resistance of a second resistance temperature coefficient which is different from the first resistance temperature coefficient, the second current signal flowing through the second resistance circuit to form the second processing signal.

12. The temperature detecting circuit of claim 11, wherein the second resistance temperature coefficient is smaller than zero.

13. The temperature detecting circuit of claim 10, wherein the second temperature coefficient is essentially zero, and the second processing signal is adapted for a feedback control of the voltage converter circuit, performing the adaptive voltage positioning, optimized phase number determination in a multi-phase voltage converter circuit, or over-current protection.

14. The temperature detecting circuit of claim 10, wherein the temperature calculating unit further comprises:

a multiplexer, including a control node, a first mux-input node, a second mux-input node, and a mux-output node, the first mux-input node coupled to the first detecting output node, the second mux-input node coupled to the second detecting output node, and the multiplexer selectively couples the mux-output node to one of the first mux-input node and the second mux-input node according to a control signal received by the control node;

an analog-to-digital converter, including an analog input node and a digital output port, the analog input node coupled to the mux-output node, and the analog-to-digital converter linearly converting the signal on the analog input node to a digital signal on the digital output port; and a digital processing unit, including a digital input port coupled to the digital output port and performing calculation on the first processing signal and the second processing signal to derive the temperature value.

15. The temperature detecting circuit of claim 10, wherein the voltage converter circuit is a single-phase fly-back switching voltage converter, a single-phase boost switching voltage converter, a single-phase Buck switching voltage converter, a multi-phase fly-back switching voltage converter, a multi-phase boost switching voltage converter, or a multi-phase Buck switching voltage converter.

* * * * *